(12) United States Patent
Ikeda

(10) Patent No.: US 6,289,127 B1
(45) Date of Patent: Sep. 11, 2001

(54) INFORMATION PROCESSING APPARATUS AND METHOD

(75) Inventor: Yasuyuki Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/124,224

(22) Filed: Jul. 29, 1998

(30) Foreign Application Priority Data

Jul. 31, 1997 (JP) .................................................. 9-205862

(51) Int. Cl.[7] ...................................................... G06K 9/36
(52) U.S. Cl. ............................ 382/232; 345/433; 348/231
(58) Field of Search ............................ 382/232; 345/433, 345/507; 358/296; 348/231

(56) References Cited

U.S. PATENT DOCUMENTS

| | | | | |
|---|---|---|---|---|
| 5,587,977 | * | 12/1996 | Murata | .................................... 369/25 |
| 5,659,675 | * | 8/1997 | Kurokawa et al. | ................... 345/433 |
| 5,729,350 | * | 3/1998 | Ozaki | .................................... 358/296 |
| 5,751,857 | * | 5/1998 | Kobayashi et al. | .................. 382/232 |
| 5,761,480 | * | 6/1998 | Fukada et al. | ......................... 395/500 |
| 5,852,467 | * | 12/1998 | Ogino | .................................... 348/231 |

* cited by examiner

Primary Examiner—Jose L. Couso
Assistant Examiner—Anh Hong Do
(74) Attorney, Agent, or Firm—Fitzpatrick, Cella, Harper & Scinto

(57) ABSTRACT

An information processing apparatus and method for inputting encoded information, storing the input information in a detachable information storage device as an information file, reading out, from a program storage device, an information processing program having a function of expanding the information file and reproducing the information using an arbitrary external device, and storing the information processing program in the detachable information storage device in order to transfer the information processing program and information file to the external device.

21 Claims, 8 Drawing Sheets

INFORMATION PROCESSING APPARATUS AND METHOD

BACKGROUND OF THE INVENTION

1. Field of the Invention

The present invention relates to an information processing apparatus and method of allowing various devices to reproduce information stored in a unique file format.

2. Related Background Art

Conventionally, a digital still camera which photoelectrically converts sensed optical image data into electrical image data using an image pickup device (photoelectric conversion device) and records the image data in a recording medium (memory) is known.

In this digital still camera, since the electrical image data after photoelectric conversion has a large quantity of digital data, the image data is generally compressed and encoded to reduce the data amount, and stored in a memory incorporated in the digital still camera as a compressed image file.

For the compressed image file, a compression scheme unique to the digital still camera is often used. For this reason, a compressed image file having a unique file format in place of a general-purpose file format is stored in the memory.

Even when JPEG (Joint Photographic coding Experts Group) format, a standard scheme of coding a still image, is used, a file format different from the normal JPEG file format is often employed by, e.g., omitting the header. This is equivalent to the use of a compression scheme that is unique to each digital still camera.

As described above, the conventional digital still camera stores the picked up image in the memory as a compressed image file in a unique file format. To reproduce the compressed image file stored in the memory, the decoder side needs to expand the compressed image file using an expansion (decoding) scheme corresponding to the compressed image file.

More specifically, unless the compressed image file is expanded by image processing software allowing expansion of a compressed image file in a unique file format, the image cannot be displayed on a screen. For this reason, a picked up image cannot be immediately reproduced.

The compressed image file in the unique file format cannot be expanded using general image processing software, so image processing software (image processing program) exclusively used for the digital still camera must be prepared.

More specifically, when the image is to be displayed on an external device to reproduce the compressed image file stored in the memory of the digital still camera, the compressed image file cannot be expanded and displayed unless the external device has installed the dedicated image processing software in advance.

SUMMARY OF THE INVENTION

The present invention has been made in consideration of the above situation, and has as its object to provide an information processing apparatus and method capable of easily expanding an information file in any file format without preparing information processing software dedicated to expanding the information file, thereby reproducing the information.

In order to achieve the above object, according to an aspect of the present invention, there are provided an information processing apparatus and method of inputting encoded information, storing the input information in detachable information storage means as an information file, reading out, from program storage means, an information processing program having a function of expanding the information file and reproducing the information using an arbitrary external device, and storing the information processing program in the information storage means.

According to another aspect of the present invention, there are provided an information processing apparatus and method of inputting encoded information, storing the input information in detachable information storage means as an information file, reading out, from program storage means, an information processing program having a function of expanding the information file and reproducing the information using an arbitrary external device, and transferring the information processing program to the external device.

Other objects, features and advantages of the invention will become apparent from the following description taken in conjunction with the accompanying drawings.

DETAILED DESCRIPTION OF THE PREFERRED EMBODIMENTS

Embodiments of the present invention will be described below with reference to the accompanying drawings.

The first embodiment will be described.

Figure 1:
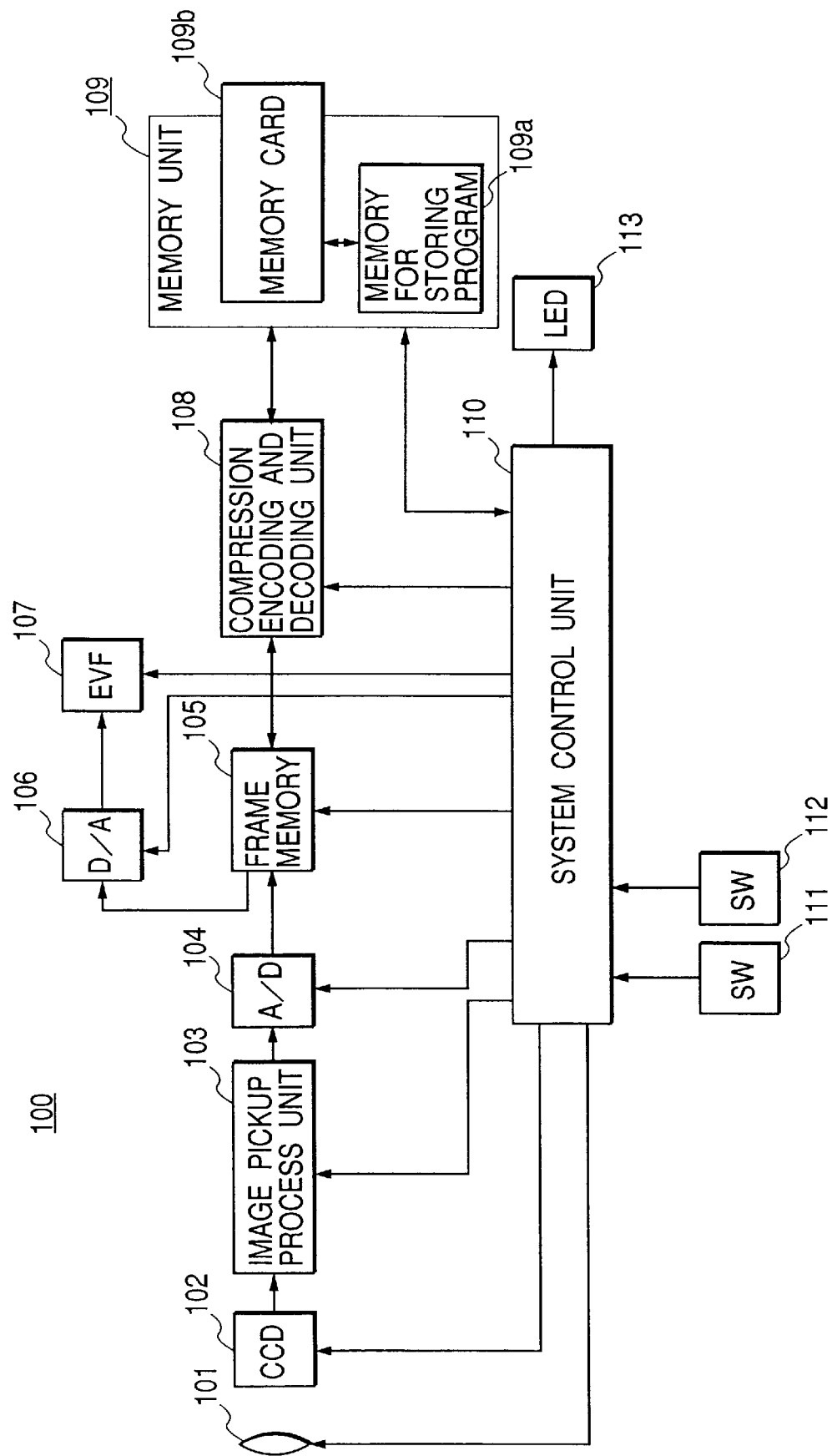
FIG. 1 is a block diagram showing the arrangement of a digital still camera according to the first embodiment of the present invention.

An information processing apparatus according to the present invention is applied to a digital still camera 100 as shown in FIG. 1.

Circuits incorporated in the digital still camera 100 shown in FIG. 1 will be described first.

A lens unit 101 including a photographing lens and a lens driving circuit (not shown) forms an image of light from an object on an image pickup device 102 on the output side under the control of a system control unit 110.

The image pickup device 102 is a photoelectric conversion device such as a CCD (Charge Coupled Device) which converts the object image formed by the lens unit 101 into an image signal.

An image pickup process unit 103 performs predetermined processing such as gamma (γ) correction for the image signal obtained by the image pickup device 102.

An A/D converter 104 converts the image signal output from the image pickup process unit into a digital signal.

A frame memory 105 temporarily stores the image signal from the A/D converter 104 or a compression encoding and decoding unit 108 (to be described later).

A D/A converter 106 converts the image signal read out from the frame memory 105 into an analog image signal.

An EVF 107 (Electrical View Finder) displays the image signal output from the D/A converter 106.

The compression encoding and decoding unit 108 having a microprocessor or work memory (not shown) for compressing a digital image signal compresses a photographed digital image signal under the control of the system control unit 110 to generate a compressed image file in a file format unique to the digital still camera 100 and outputs the compressed image file to a memory card 109b of a memory unit 109. Also, the compression encoding and decoding unit 108 expands (decodes) the compressed image file and outputs the image signal to the frame memory 105.

The compression encoding and decoding unit 108 can use either a general-purpose compression encoding scheme such as JPEG or a unique compression encoding scheme.

When a general-purpose compression encoding scheme such as JPEG is used, a file format different from the JPEG format is employed by, e.g., omitting the header.

Image data compression encoding processing will be described with reference to FIG. 11.

Figure 11:
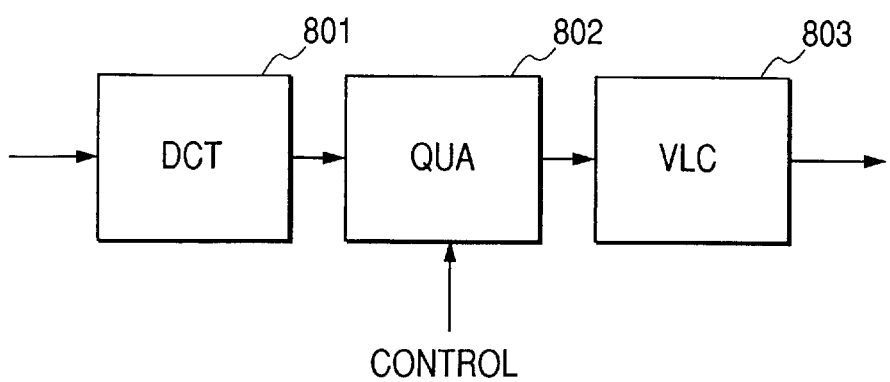
FIG. 11 is a view showing the hardware circuit arrangement for performing compression encoding processing.

FIG. 11 shows a hardware circuit arrangement for performing compression encoding processing. This compression encoding processing can also be performed as software processing, as a matter of course.

Input image data is segmented into, e.g., 8×8 pixel blocks, and a DCT transformation circuit 801 performs DCT (Discrete Cosine Transform) transformation for each block. The DCT-transformed image data is quantized by a quantization circuit 802. The quantization step used by the quantization circuit 802 is controlled such that a predetermined code amount is obtained by variable length coding.

The image data quantized by the quantization circuit 802 is subjected to variable length coding by a variable length coding circuit 803.

Referring back to FIG. 1, the memory unit 109 has a memory 109a for storing program and the detachable memory card 109b. The memory 109a for storing program comprises a nonvolatile memory such as an EEPROM (Electrically Erasable Programmable Read Only Memory) or a flash memory.

The memory 109a for storing program stores, in advance, an image display program having a function of expanding a compressed image file obtained by the compression encoding and decoding unit 108 and displaying the image on the screen and a function of converting the compressed image file in a file format unique to the digital still camera in FIG. 1 into a compressed image file in a general-purpose file format, or various processing programs to be executed by the system control unit 110.

The memory card 109b is comprised of a rewritable memory such as an SRAM (Static Random Access Memory) or a flash memory. The memory card 109b stores the compressed image file in the unique file format, which is obtained from the compression encoding and decoding unit 108.

The system control unit 110 reads out various processing programs stored in the memory 109a for storing program in advance, and controls the respective units of the digital still camera to control the entire operation.

A switch 111 is a release switch for photographing. The switch 111 has a half-depressed state for the AF (Auto Focus) function or AE (Automatic Exposure) function and a full-depressed state for actually performing a release operation. Operation control based on the state of the switch 111 is performed by the system control unit 110. More specifically, the system control unit 110 detects the state of the switch 111 and controls the operation of the camera in accordance with the detected switch state to perform the AF function, the AE function, or a release operation.

A switch 112 is an instruction switch for transferring the above-described image display program from the memory 109a for storing program to the memory card 109b. The state of the switch 112 is also detected by the system control unit 110. The system control unit 110 controls the memory unit 109 in accordance with the state of the switch 112 such that the image display program is transferred to the memory card 109b.

An LED (Light Emitting Diode) 113 is a warning LED. The blinking operation of the LED is controlled by the system control unit 110. For example, when the memory card 109b is not inserted into the memory unit 109, when the capacity of space area of the memory card 109b is smaller than the size of the image display program, or when the capacity of space area of the memory card 109b is expected to become smaller than the size of the image display program after the next photographing, i.e., when the image display program cannot be transferred to the memory card 109b after the next photographing, the LED 113 is blinked at a corresponding interval to give a warning to the photographer.

Figure 2:
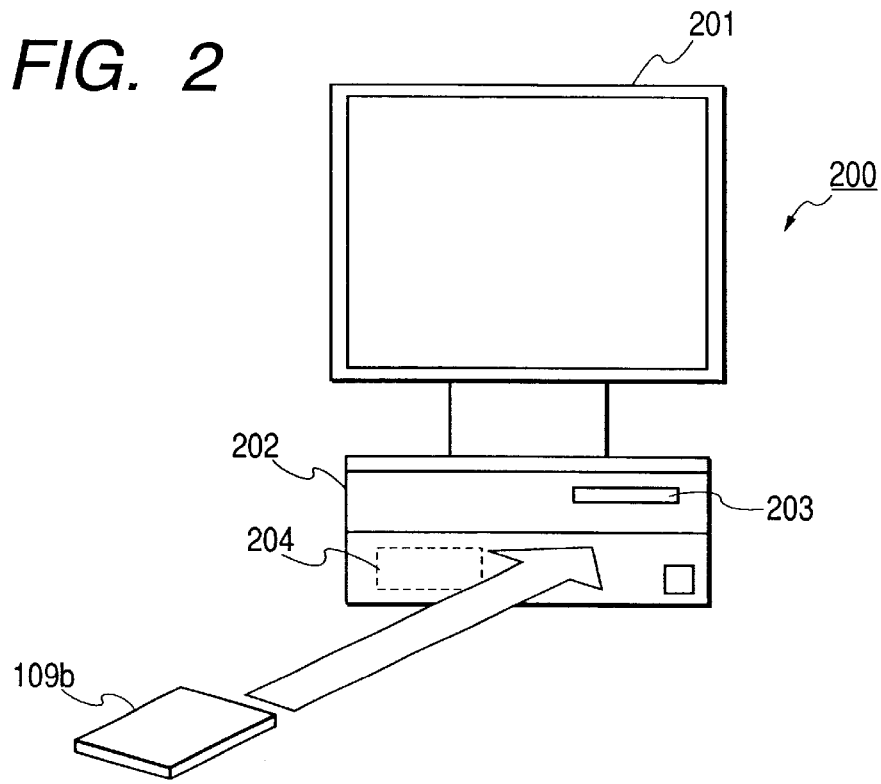
FIG. 2 is a view showing an image observation device for expanding a compressed image file obtained by picking up an image with the digital still camera shown in FIG. 1 and displaying the image on a screen.

A compressed image file obtained by the above-described digital still camera 100 is expanded by, e.g., an image observation device 200 shown in FIG. 2 and displayed on the screen.

As shown in FIG. 2, the image observation device 200 comprises a personal computer 202, a memory card insertion unit 203 arranged in the personal computer 202, and a display 201 connected to the personal computer 202.

The personal computer 202 controls the operation of the entire image observation device 200 and also has a function of reading data stored in the memory card inserted into the memory card insertion unit 203.

The personal computer 202 incorporates a memory 204 storing various processing programs in advance. The processing programs are read and executed by the personal computer 202 to control the operation of the image observation device 200 (to be described later).

The image observation device 200 does not have a pre-installed image processing program dedicated to expand a compressed image file in a file format unique to the digital still camera 100 and display the image on the screen.

For this reason, the memory card insertion unit 203 can receive the above-described memory card 109b. When the memory card 109b is inserted into the memory card insertion unit 203, the compressed image file and the image display program written on the memory card 109b are read by the personal computer 202. The personal computer 202 reads out the image display program stored in the memory card 109b inserted into the memory card insertion unit 203 and executes the image display program, thereby expanding the compressed image file in the unique file format, which is stored in the memory card 109b, and displaying the image on the display 201. Detailed of this operation will be described later.

The operation of the digital still camera 100 under the control of the system control unit 110 will be described next in detail.

Figure 3:
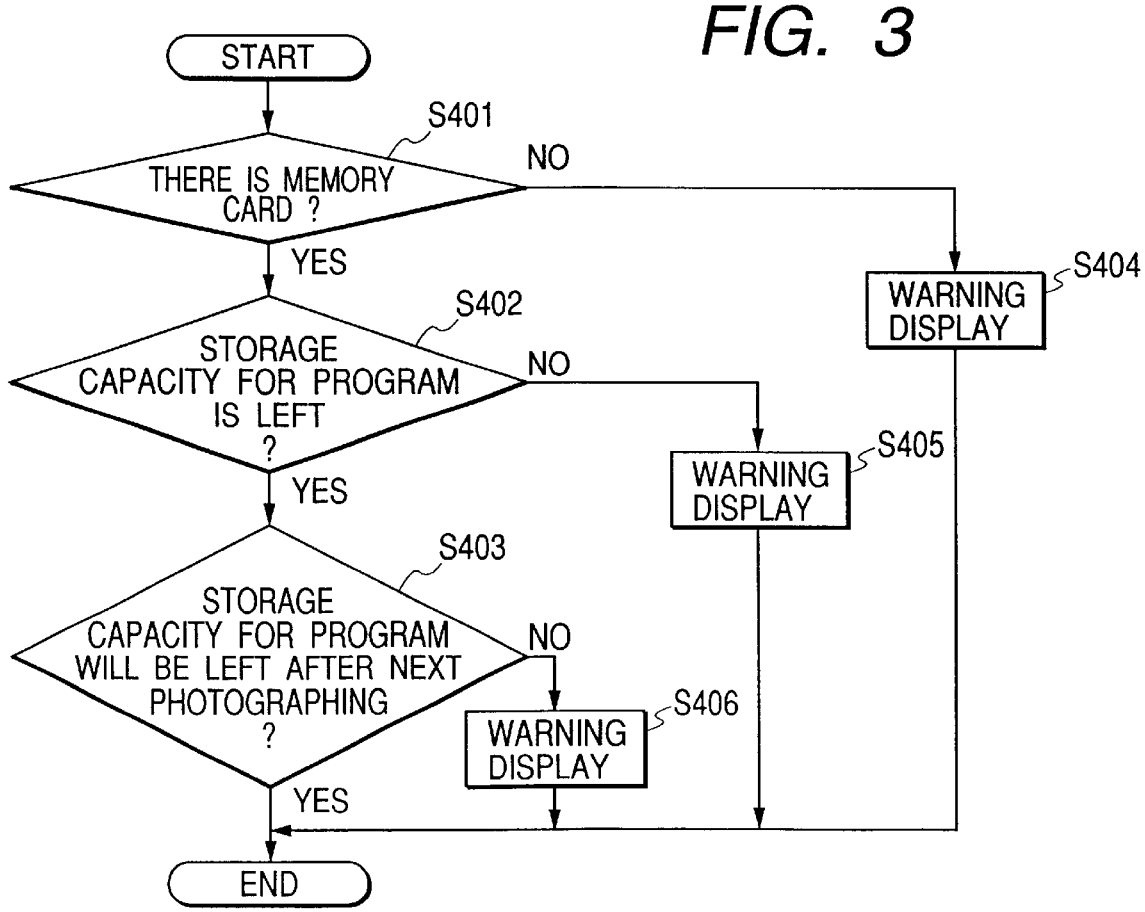
FIG. 3 is a flow chart for explaining operation associated with a memory card on powering the digital still camera 100 in FIG. 1.
Figure 4:
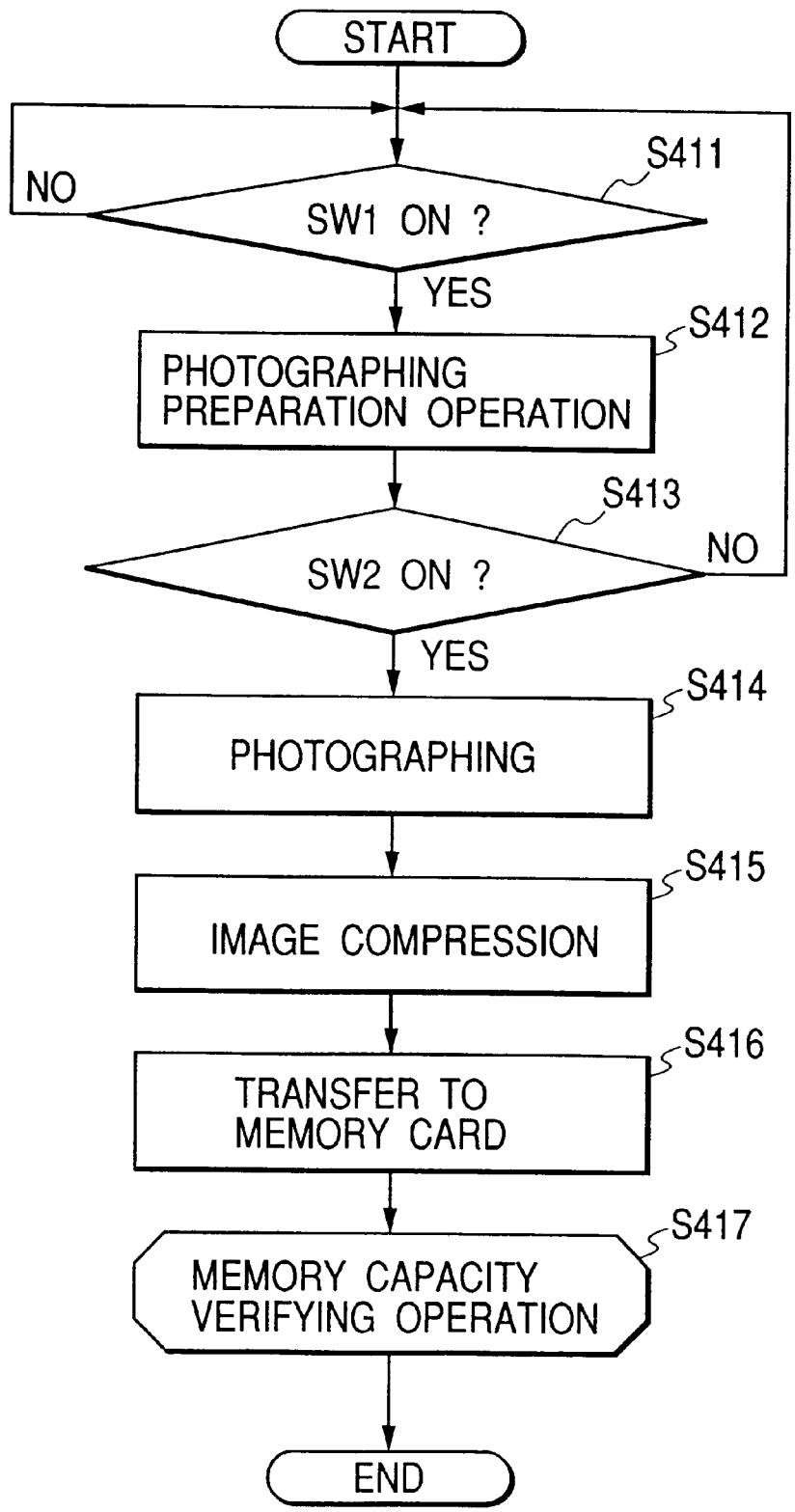
FIG. 4 is a flow chart for explaining photographing operation in the digital still camera 100 in FIG. 1.
Figure 5:
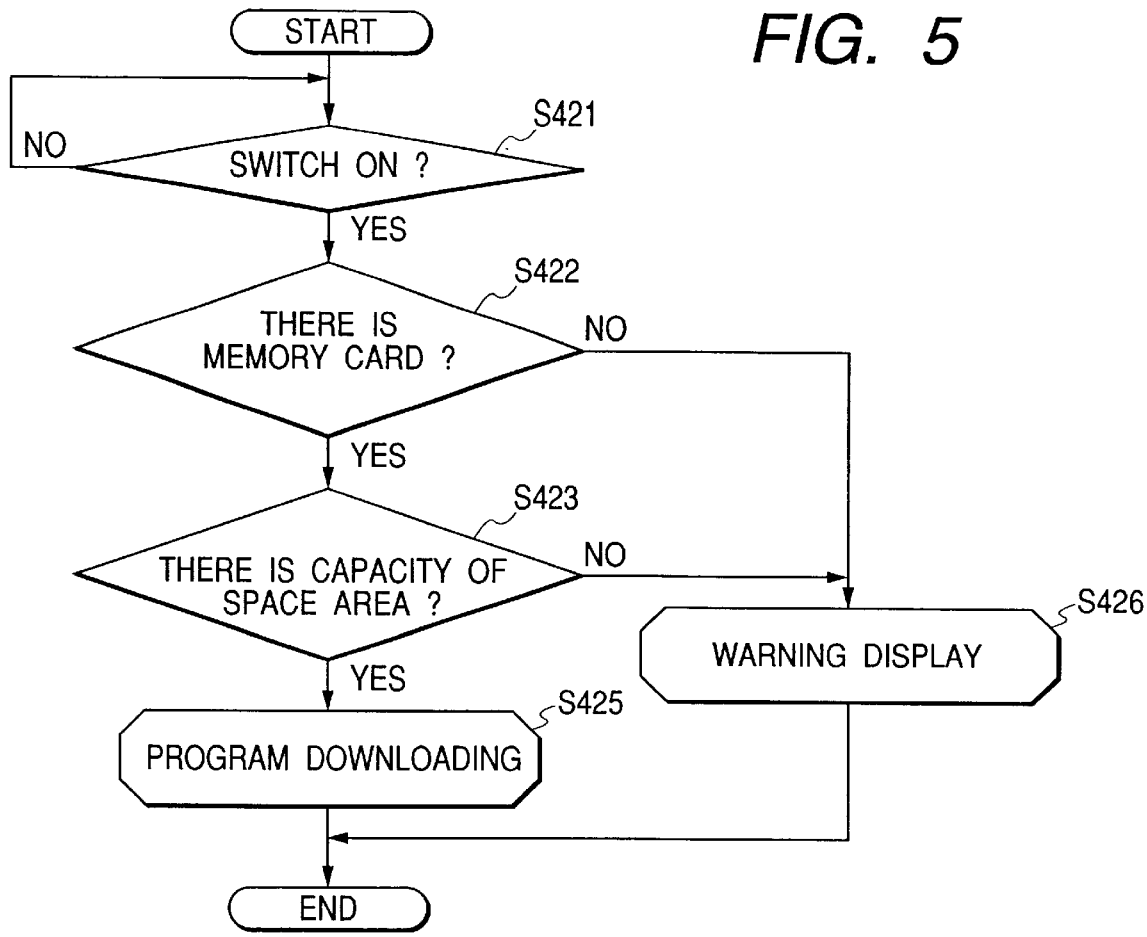
FIG. 5 is a flow chart for explaining operation associated with an image display program transfer instruction switch in the digital still camera 100 in FIG. 1.

The memory 109a for storing program stores, in advance, processing programs according to the flow charts shown in FIGS. 3 to 5. When these processing programs are read out and executed by the system control unit 110, the digital still camera 100 operates as follows.

The memory 109a for storing program also stores the above-described image display program in advance.

When the digital still camera 100 is powered, the system control unit 110 recognizes it and determines whether the memory unit 109 has the memory card 109b, as shown in FIG. 3 (step S401).

If YES in step S401, the system control unit 110 determines whether a capacity (storage capacity) for storing the image display program is left in the inserted memory card 109b (step S402).

If YES in step S402, the system control unit 110 determines whether a capacity for storing the image display program is left in the memory card 109b after the next photographing (step S403).

If YES in step S403, the system control unit 110 controls the operation of the entire digital still camera 100 such that the digital still camera 100 is set in a state ready to photograph, and ends the processing.

If NO in step S401, the system control unit 110 blinks the warning LED 113 to help the photographer recognize this state (no memory card state) (step S404) and ends the processing.

If NO in step S402, the system control unit 110 blinks the warning LED 113 at an interval different from that in step S404 to help the photographer recognize this state (image display program transfer disabled state) (step S405) and ends the processing.

If NO in step S403, the system control unit 110 controls the operation of the entire digital still camera 100 such that the digital still camera 100 is temporarily set in a state ready to photograph. When no storage capacity is expected to be left in the memory card 109b after the next photographing, the system control unit 110 blinks the warning LED 113 as in step S405 to help the photographer recognize this state (image display program transfer disabled state) (step S406) and ends the processing.

When the digital still camera 100 is ready to photograph, the system control unit 110 determines whether the switch 111 is in a half-depressed state, i.e., a switch 1 state (SW1 ON state) for performing the AF function or the AE function, as shown in FIG. 4 (step S411).

If NO in step S411, the system control unit 110 waits until the switch 111 is in the SW1 ON state.

If YES in step S411, the system control unit 110 controls the operation of the digital still camera 100 to perform photographing preparation operation such as the AF function or AE function (step S412).

When the photographing preparation operation is performed, the system control unit 110 determines whether the switch 111 is in the switch 2 state (SW2 ON state) for release (step S413).

If NO in step S413, the system control unit 110 stops control of the photographing preparation operation. The flow returns to step S411 to wait until the switch 111 is set in the SW1 ON state again.

If YES in step S413, the system control unit 110 controls the system control unit 110 to perform actual photographing (step S414).

The object image is formed on the image pickup surface of the image pickup device 102 through the lens unit 101. The optical image data is converted into electrical image data by the image pickup device 102. The electrical image data is supplied to the compression encoding and decoding unit 108 through the image pickup process unit 103, the A/D converter 104, and the frame memory 105.

After processing in step S414, the system control unit 110 controls compression processing in the compression encoding and decoding unit 108 (step S415).

The compression encoding and decoding unit 108 compresses the digitized image data to generate a compressed image file in a unique file format.

After processing in step S415, the system control unit 110 controls data transfer from the compression encoding and decoding unit 108 to the memory unit 109 (step S416).

The compression encoding and decoding unit 108 writes the generated compressed image file in the memory card 109b of the memory unit 109.

After processing in step S416, the system control unit 110 performs the same processing as in step S403. More specifically, the system control unit 110 determines whether the storage capacity for the image display program is expected to remain in the memory card 109b after the next photographing. If it is determined that the storage capacity is expected to remain in the memory card 109b, processing is ended. If no storage capacity is expected to remain in the memory card 109b, the system control unit 110 blinks the LED 113 when no storage capacity is available after the next photographing, thereby informing the photographer that image display program transfer is impossible, and ends the processing (step S417).

When the compressed image file is stored in the memory card 109b in the above-described manner, the system control unit 110 determines next whether the switch 112 for transferring the image display program from the memory 109a for storing program to the memory card 109b is ON, as shown in FIG. 5 (step S421).

If NO in step S421, the system control unit 110 waits until the switch 112 is turned on.

If YES in step S421, the system control unit 110 determines whether the memory unit 109 has the memory card 109b (step S422).

If YES in step S422, the system control unit 110 determines whether a capacity (storage capacity) for storing the image display program stored in the memory 109a for storing program is left in the inserted memory card 109b (step S423).

If YES in step S423, the system control unit 110 controls data transfer (download) from the memory 109a for storing program to the memory card 109b (step S425), and ends the processing.

With this processing, the image display program stored in the memory 109a for storing program is transferred to the memory card 109b, and consequently, the memory card 109b stores the generated compressed image file and the image display program.

If NO in step S422, the system control unit 110 blinks the LED 113 as in step S404 (FIG. 3) to inform the photographer that the memory card is not inserted and ends the processing.

If NO in step S423, the system control unit 110 blinks the LED 113 as in step S405 (FIG. 3) to inform the photographer that image display program transfer is impossible (step S426) and ends the processing.

In the above-described manner, the compressed image file in the file format unique to the digital still camera 100 and the image display program for expanding and displaying the compressed image file are stored in the memory card 109b. The memory card 109b is inserted from the memory card insertion unit 203 into the personal computer 202 of the image observation device 200 shown in FIG. 2.

Figure 6:
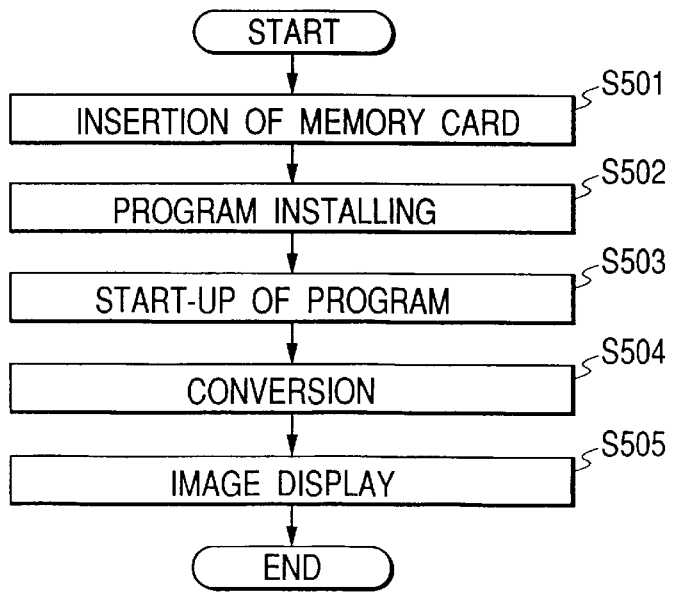
FIG. 6 is a flow chart for explaining the operation of an image observation device 200.

The memory 204 of the personal computer 202 stores a processing program according to the flow chart shown in FIG. 6 in advance. When the personal computer 202 reads out and executes the processing program, the image observation device 200 operates as follows.

As shown in FIG. 6, when the memory card 109b is inserted into the memory card insertion unit 203 of the personal computer 202 (step S501), the personal computer 202 detects it and reads out the image display program stored in the memory card 109b to install the image display program (step S502).

Next, the personal computer 202 starts up the image display program installed in step S502 (step S503), thereby converting the compressed image file stored in the memory card 109b, i.e., the compressed image file in the file format unique to the digital still camera 100 into a general-purpose file format (step S504). The personal computer 202 expands the image file and displays it on the display 201 (step S505), and processing is ended.

As described above, in the first embodiment, when the photographer operates the switch 112 of the digital still camera 100, the compressed image file in the file format unique to the digital still camera 100 and the image display program for converting the compressed image file into a general-purpose file format, expanding the image file, and displaying it on the screen are stored in the memory card 109b. Therefore, even when the personal computer on which the compressed image file in the unique file format, which is obtained by the digital still camera 100, is to be displayed does not have a dedicated image display program for expanding the compressed image file and displaying it on the screen, the compressed image file in the unique file format can be easily expanded and displayed on the personal computer by reading out the image display program stored in the memory card 109b together with the compressed image file and executing the image display program.

If no more capacity of space area for storing the image display program is expected to be left in the memory card 109b after the next photographing, the photographer is warned of the state. With this arrangement, the photographer can know in advance whether the capacity of space area for storing the image display program is left in the memory card 109b.

Therefore, independently of the file format of the compressed image file obtained by the digital still camera 100, the image observation device 200 can easily display the image on the screen, and the operability can also be improved.

The personal computer on which the compressed image file obtained by the digital still camera 100 is to be displayed may perform only processing of converting the compressed image file in the unique file format into a general-purpose file format in accordance with the image display program stored in the memory card 109b. Processing of expanding the compressed image file in the general-purpose file format, which is obtained upon conversion, and displaying it on the screen may be performed on the basis of a processing program stored in the personal computer in advance.

The second embodiment will be described next.

Figure 7:
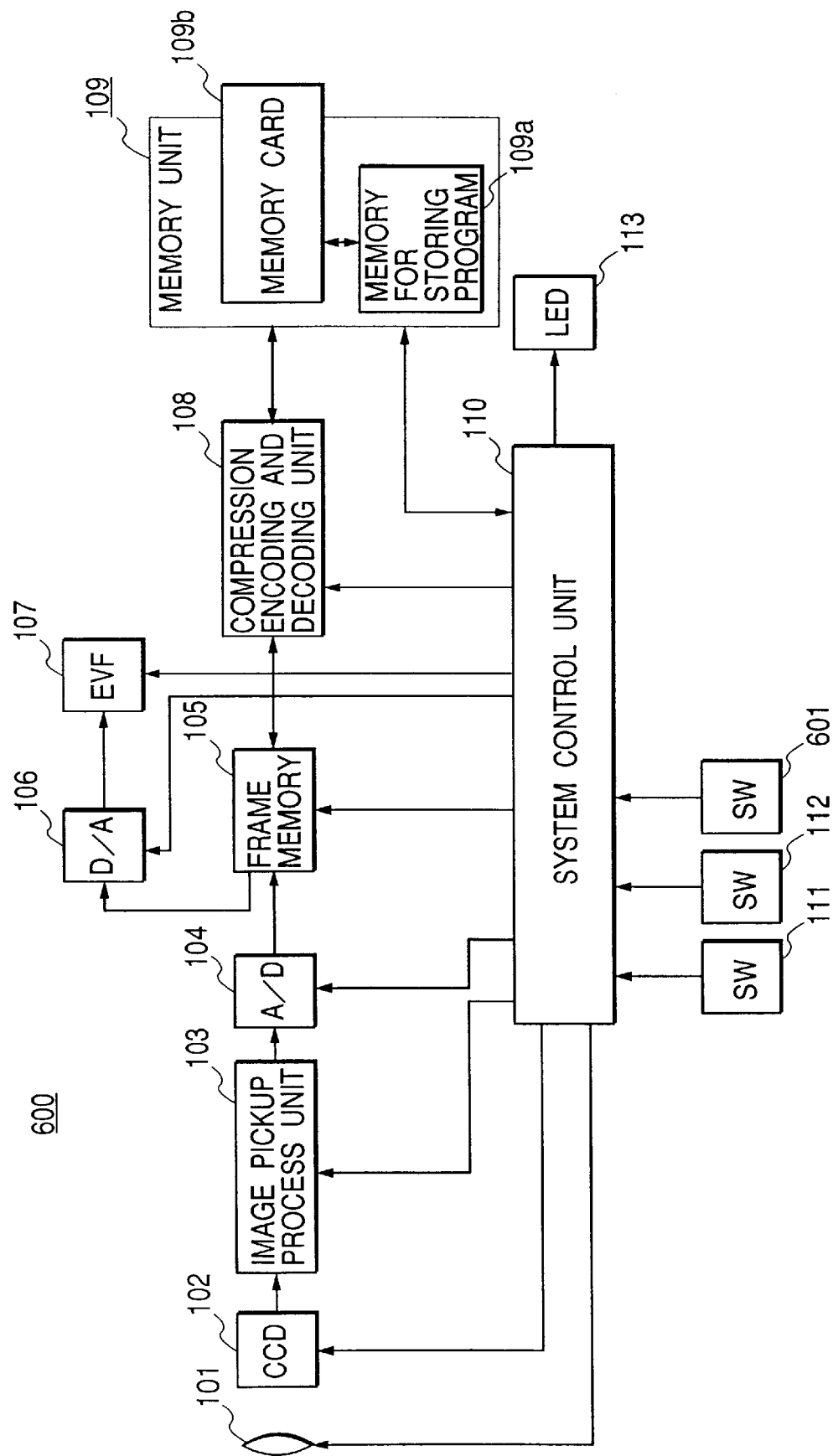
FIG. 7 is a block diagram showing the arrangement of a digital still camera according to the second embodiment of the present invention.

An information processing apparatus according to the present invention is applied to a digital still camera 600 shown in FIG. 7.

The digital still camera 600 has the same arrangement as that of the digital still camera 100 in the above-described first embodiment (FIG. 1) except that a program selection switch 601 is added to the arrangement of the digital still camera 100.

The same reference numerals as in the digital still camera 100 shown in FIG. 1 denote the same parts in the digital still camera 600 shown in FIG. 7, and a detailed description thereof will be omitted.

With the program selection switch 601, the digital still camera 600 can select an image display program corresponding to the operating system (OS) of a personal computer 202 of an image observation device 200 shown in FIG. 2 from a plurality of image display programs.

A memory 109a for storing program of a memory unit 109 stores a plurality of image display programs in advance.

Figure 8:
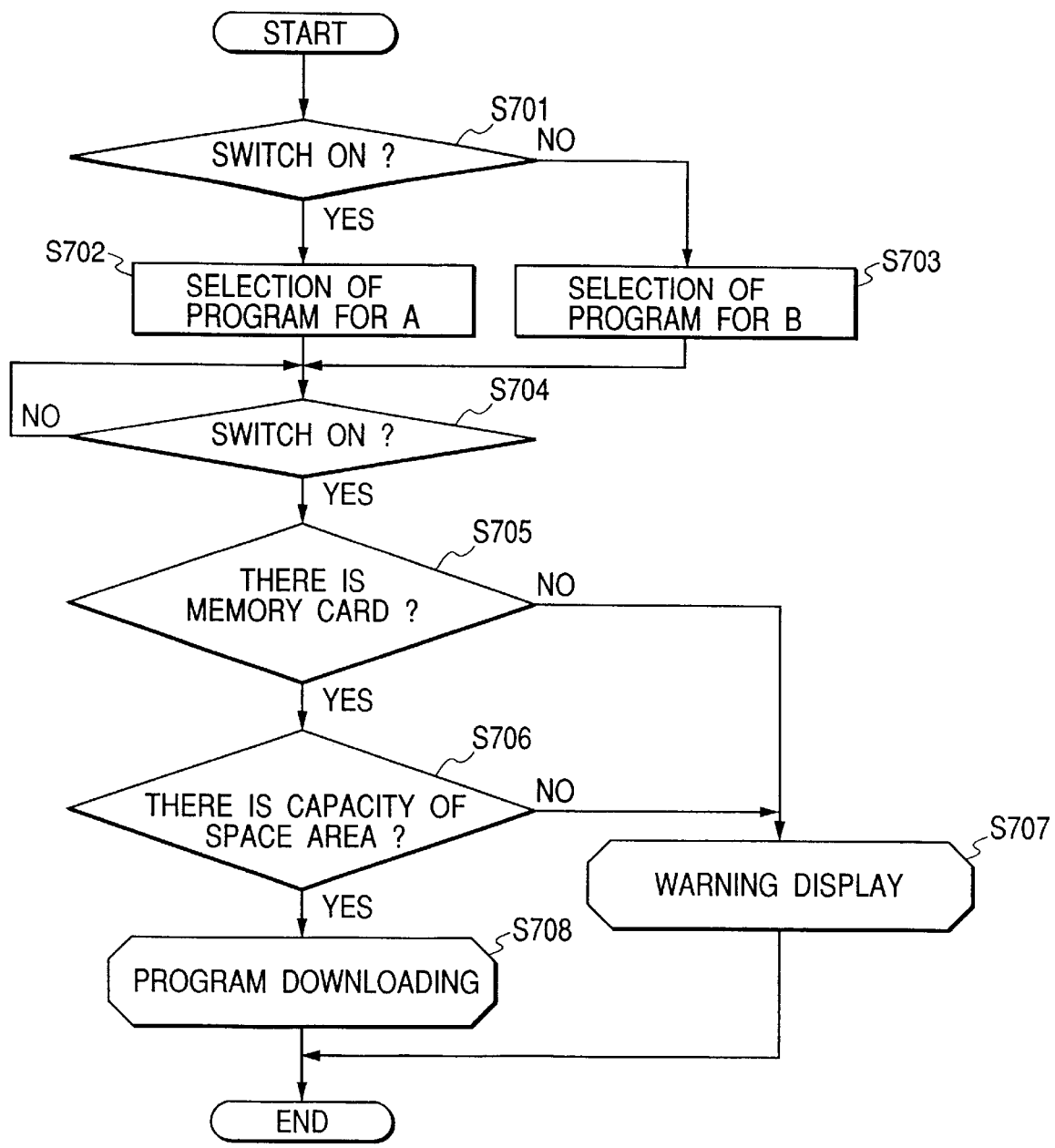
FIG. 8 is a flow chart for explaining operation associated with an image display program selection instruction switch in a digital still camera 600 in FIG. 7.

The memory 109a for storing program of the memory unit 109 also stores a processing program according to the flow chart shown in FIG. 8 in advance. When a system control unit 110 reads out and executes the processing program, the digital still camera 600 operates as follows.

For example, the memory 109a for storing program of the memory unit 109 stores, in advance, an image display program for an arbitrary OS (to be referred to as an image display program for A hereinafter) and an image display program for an OS different from the arbitrary OS (to be referred to as an image display program for B hereinafter). The OS of the image observation device 200 corresponds to one of the image display program for A and the image display program for B.

In the initial state, the image display program for B is selected. That is, unless the program selection switch 601 is depressed (ON), the image display program for B is selected. When the program selection switch 601 is depressed, the image display program for A is selected.

First, the system control unit 110 determines whether the program selection switch 601 is ON (step S701).

If NO in step S701, i.e., if the program selection switch 601 is not depressed, the system control unit 110 detects selection of the image display program for B (step S703).

If YES in step S701, i.e., if the program selection switch 601 is depressed, the system control unit 110 detects selection of the image display program for A (step S702).

The system control unit 110 determines whether a switch 112 for transferring the image display program from the memory 109a for storing program to a memory card 109b is ON (step S704).

If NO in step S704, the system control unit 110 waits until the switch 112 is turned on.

If YES in step S704, the system control unit 110 determines whether the memory unit 109 has the memory card 109b (step S705).

If YES in step S705, the system control unit 110 determines whether the memory card 109b has a capacity of space area for storing the image display program for A or B (to be referred to as the selected program hereinafter) selected in step S701 from the plurality of image display programs stored in the memory 109a for storing program (step S706).

If YES in step S706, the system control unit 110 controls transfer (download) of the selected program from the memory 109a for storing program to the memory card 109b (step S708), and ends the processing.

With this processing, the program selected from the plurality of image display programs stored in the memory 109a for storing program is transferred to the memory card 109b, and consequently, the memory card 109b stores the generated compressed image file and the selected program.

If NO in step S705, the system control unit 110 blinks an LED 113 as in step S404 in FIG. 3 to inform the photographer that the memory card is not inserted and ends the processing.

If NO in step S706, the system control unit 110 blinks the LED 113 as in step S405 in FIG. 3 to inform the photographer that image display program transfer is impossible and ends the processing (step S707).

As described above, in the second embodiment, an image display program corresponding to the operation of the program selection switch 601 is selected from the plurality of image display programs stored in the memory 109a for storing program in advance, and stored in the memory card 109b. With this arrangement, an image display program corresponding to the OS of the personal computer on which the compressed image file obtained by photographing using the digital still camera 600 is to be displayed can be selected using the program selection switch 601. Consequently, in addition to the effect of the above-described first embodiment, the compressed image file in the unique file format can be expanded and displayed on the personal computer independently of the OS of the personal computer to be used for screen display.

The third embodiment will be described next.

Figure 9:
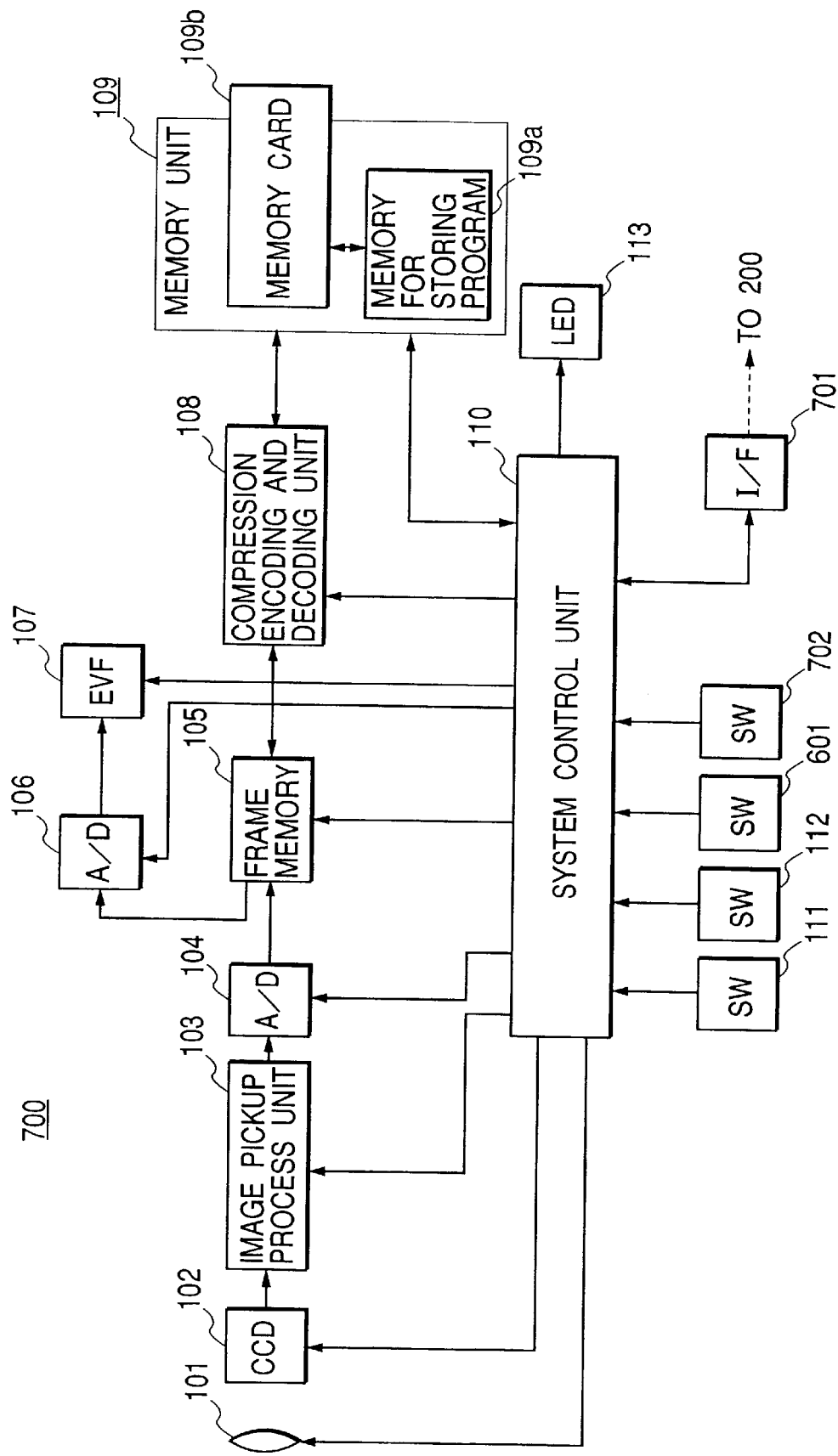
FIG. 9 is a block diagram showing the arrangement of a digital still camera according to the third embodiment of the present invention.

FIG. 9 shows an information processing apparatus of the present invention.

A digital still camera 700 has the same arrangement as the digital still camera 600 (FIG. 7) in the above-described second embodiment except that a digital interface 701 capable of data communication with an image observation device 200 as shown in FIG. 2 and a switch 702 for instructing to transfer an image file through the digital interface 701 are added to the arrangement of the digital still camera 600.

The same reference numerals as in the digital still camera 600 shown in FIG. 7 denote the same parts in the digital still camera 700 shown in FIG. 9, and a detailed description thereof will be omitted. As the digital interface 701, USB, IEEE 1394, or the like can be used.

In the first and second embodiments, an image file is sent to the image observation device 200 by the memory card 109b. However, in the third embodiment, an image file is transferred through the digital interface 701.

Figure 10:
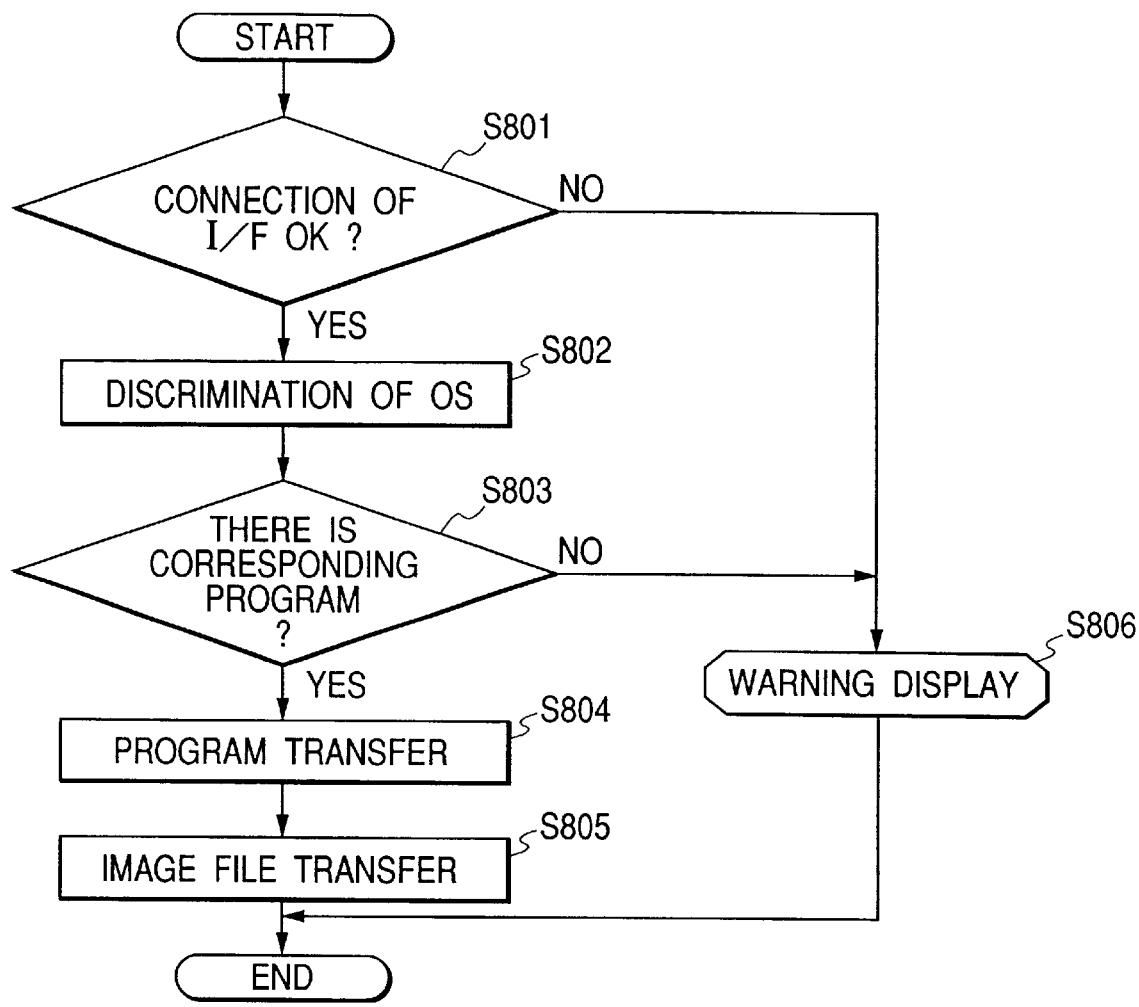
FIG. 10 is a flow chart showing operation associated with an image file transfer instruction switch in a digital still camera 700 in FIG. 9.

The image file transfer processing of the digital still camera 700 of this embodiment will be described below with reference to the flow chart of FIG. 10.

The flow starts upon operating the switch 702.

It is determined whether the switch 702 is connected to the image observation device 200 (step S801).

If NO in step S801, warning display is made (e.g., an LED 113 is blinked, or a warning is displayed on an EVF 107) to inform the user that the image observation device 200 is not connected, and processing is ended (step S806).

If YES in step S801, the OS of the image observation device 200 is discriminated by communication (step S802).

Next, it is determined whether an image display program corresponding to the OS discriminated in step S802 is stored in a memory 109a for storing program (step S803).

If NO in step S803, warning display is made (e.g., the LED 113 is blinked, or a warning is displayed on the EVF 107) to inform the user that the image display program is not stored, and processing is ended (step S806).

If YES in step S803, the image display program is read out from the memory 109a for storing program and transferred to the image observation device 200 through the digital interface 701 (step S804). After this, an image file is read out from the memory card 109b and transferred to the image observation device 200 through the digital interface 701, and processing is ended.

According to this embodiment, the image display program corresponding to the transfer destination is automatically recognized and transferred together with the image file, resulting in a high convenience for the user.

The object of the present invention can also be achieved when a storage medium such as the memory card 109b or the memory 204 storing the program codes of software for realizing the functions of the host and terminal of each of the above-described embodiments is supplied to a system or apparatus, and the computer (or a CPU or an MPU) of the system or apparatus reads out and executes the program codes stored in the storage medium, as a matter of course.

In this case, the program codes read out from the storage medium realize the function of each of the above-described embodiments by themselves, and the storage medium storing the program codes constitutes the present invention.

As the storage medium for supplying the program codes, a ROM, a RAM, a floppy disk, a hard disk, an optical disk, a magnetooptical disk, a CD-ROM, a CD-R, a magnetic tape, or a nonvolatile memory card such as the memory card 109b can be used.

The present invention incorporates not only a case wherein the computer executes the readout program codes to realize the function of each of the above embodiments but also a case wherein an OS running on the computer performs part or all of actual processing on the basis of instructions of the program codes to realize the function of each of the above embodiments.

The present invention also incorporates a case wherein the program codes read out from the storage medium are written in a memory of a function expansion board inserted into the computer or a function expansion unit connected to the computer, and then, the CPU of the function expansion board or function expansion unit performs part or all of actual processing on the basis of instructions of the program codes to realize the function of each of the above embodiments.

The present invention can be applied to an apparatus comprising a single device, as shown in FIG. 1 or 7, or a system built by a plurality of devices.

In the above embodiments, a digital still camera has been exemplified. However, the present invention may be applied to a digital VCR for recording a moving image. The recording medium for recording a compressed image file is not limited to the memory, and various recording media such as a floppy disk, a magnetic tape, an optical card, or a smart medium can be used.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus comprising:
   a) input means for inputting encoded information;
   b) detachable information storage means for storing the encoded information input by said input means as an information file;
   c) program storage means for storing an information processing program having a function of reproducing the information file stored in said detachable information storage means, said information processing program being used to reproduce the information file at an external apparatus on which said detachable information storage means is mounted; and
   d) control means for causing the information processing program stored in said program storage means to be stored in said detachable information storage means.

2. An apparatus according to claim 1, wherein
   said program storage means stores a plurality of information processing programs, and said control means transfers a desired one of the plurality of information processing programs to said information storage means.

3. An apparatus according to claim 1, wherein the information is image data.

4. An apparatus according to claim 3, wherein
   said input means comprises an image pickup means for picking up an object image.

5. An apparatus according to claim 4, wherein
   said input means comprises encoding means for compression encoding image data picked up by said image pickup means.

6. An apparatus according to claim 5, wherein
   said encoding means performs compression encoding complying with JPEG (Joint Photographic coding Experts Group).

7. An apparatus according to claim 3, wherein
   said information processing apparatus is incorporated in an electronic camera.

8. An apparatus according to claim 1, further comprising
   warning means for outputting a warning when a storage capacity of said information storage means becomes smaller than a predetermined capacity.

9. An apparatus according to claim 1, wherein the external device comprises a personal computer.

10. An information processing apparatus comprising:
    a) input means for inputting encoded information;
    b) detachable information storage means for storing the encoded information input by said input means as an information file;
    c) program storage means for storing an information processing program having a function of reproducing the information file, the processing program being used to reproduce the information file at an external device; and
    d) transfer means for transferring the information processing program to the external device, said transfer means discriminating the ability of the external device to process the information processing program and transferring the information processing program according to a discrimination result.

11. An apparatus according to claim 10, wherein
    said program storage means stores a plurality of information processing programs, and said transfer means transfers a desired one of the plurality of information processing programs to the external device according to the discrimination result.

12. An apparatus according to claim 11, wherein the external device comprises a computer, and said transfer means transfers a desired one of the plurality of information processing programs to the external device in accordance with an operating system of the external device that is determined by the discrimination result.

13. An apparatus according to claim 10, wherein the information is image data.

14. An apparatus according to claim 13, wherein
    said input means comprises an image pickup means for picking up an object image.

15. An apparatus according to claim 14, wherein
    said input means comprises encoding means for compression encoding image data picked up by said image pickup means.

16. An apparatus according to claim 15, wherein
    said encoding means performs compression encoding complying with JPEG (Joint Photographic coding Experts Group).

17. An apparatus according to claim 13, wherein
    said information processing apparatus is incorporated in an electronic camera.

18. An apparatus according to claim 10, wherein
    said transfer means comprises a digital interface complying with USB (Universal Serial Bus).

19. An apparatus according to claim 10, wherein
    said transfer means comprises a digital interface complying with IEEE 1394.

20. An information processing method comprising the steps of:
    inputting encoded information;
    storing the input encoded information in detachable information storage means as an information file; and
    reading out, from program storage means, an information processing program having a function of reproducing the information file stored in said detachable information storage means, said information processing program being used to reproduce the information file at an external apparatus on which said detachable information storage means is mounted; and
    causing the information processing program stored in said program storage means to be stored in said detachable information storage means.

21. An information processing method comprising the steps of:
    inputting encoded information;
    storing the input encoded information in detachable information storage means as an information file;
    reading out, from program storage means, an information processing program having a function of reproducing the information file, said information processing program being used to reproduce the information file at an external device; and
    transferring the information processing program to the external device, said transfer step including a step of discriminating the ability of the external device to process the information processing program and transferring the information processing program according to a discrimination result.

* * * * *